US012651445B2

(12) United States Patent
Kum et al.

(10) Patent No.: US 12,651,445 B2
(45) Date of Patent: Jun. 9, 2026

(54) SYSTEM AND METHOD FOR PERCEIVING 3-D ENVIRONMENT USING CAMERA AND RADAR

(71) Applicant: Korea Advanced Institute of Science and Technology, Daejeon (KR)

(72) Inventors: Dongsuk Kum, Daejeon (KR); Youngseok Kim, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 302 days.

(21) Appl. No.: 18/502,678

(22) Filed: Nov. 6, 2023

(65) Prior Publication Data

US 2025/0037444 A1 Jan. 30, 2025

(30) Foreign Application Priority Data

Jul. 24, 2023 (KR) ......................... 10-2023-0096379

(51) Int. Cl.
*G06V 10/77* (2022.01)
*G01S 13/86* (2006.01)
(Continued)

(52) U.S. Cl.
CPC .......... *G06V 10/806* (2022.01); *G01S 13/867* (2013.01); *G06T 7/50* (2017.01);
(Continued)

(58) Field of Classification Search
CPC ............. G06V 10/806; G06V 10/7715; G06V 10/803; G06V 20/58; G06V 20/64;
(Continued)

(56) References Cited

U.S. PATENT DOCUMENTS

2019/0147245 A1* 5/2019 Qi ........................... G06V 10/82
382/103
2020/0175315 A1* 6/2020 Gowaikar ............... G01S 13/89
(Continued)

FOREIGN PATENT DOCUMENTS

JP 2023529766 A 7/2023
KR 102168753 B1 10/2020
KR 1020210019221 B1 4/2021

OTHER PUBLICATIONS

Liu et al, Fusing mmWave Radar with Camera for 3-D Detection in Autonomous Driving, 2022, IEEE Internet of Things Journal, 9(20): 20408-20421. (Year: 2022).*
(Continued)

*Primary Examiner* — Kathleen M Broughton
(74) *Attorney, Agent, or Firm* — IPkey PLLC

(57) ABSTRACT

A system and method for perceiving a 3-D environment by using a camera and a radar sensor are disclosed. In order to generate a 3-D feature map that is used to perceive an environment through the fusion of a camera and a radar sensor, the method of perceiving a 3-D environment may include extracting a two-dimensional (2-D) feature map from an image obtained by the camera and transforming the 2-D feature map into a feature map in a 3-D space by using first distance information extracted from the image and second distance information measured by the radar sensor.

16 Claims, 6 Drawing Sheets

300

310 320

(51) Int. Cl.

| | |
|---|---|
| *G06T 7/50* | (2017.01) |
| *G06V 10/80* | (2022.01) |
| *G06V 20/58* | (2022.01) |
| *G06V 20/64* | (2022.01) |
| *G06V 20/70* | (2022.01) |

(52) U.S. Cl.
CPC .......... *G06V 10/7715* (2022.01); *G06V 20/58* (2022.01); *G06V 20/64* (2022.01); *G06V 20/70* (2022.01); *G06T 2207/30261* (2013.01)

(58) Field of Classification Search
CPC ..... G06V 20/70; G01S 13/867; G01S 13/931; G06T 7/50; G06T 2207/30261; G06F 18/253
See application file for complete search history.

(56) References Cited

U.S. PATENT DOCUMENTS

| | | | | |
|---|---|---|---|---|
| 2021/0295090 A1* | 9/2021 | Kum | ..................... | G01S 7/4808 |
| 2022/0207868 A1* | 6/2022 | Zhang | ..................... | G01S 7/417 |
| 2023/0260266 A1* | 8/2023 | Karasev | ................ | G06T 3/4038<br>382/104 |
| 2024/0312219 A1* | 9/2024 | Choi | .................... | G06V 10/806 |

OTHER PUBLICATIONS

Wang et al, High Dimensional Frustum PointNet for 3D Object Detection from Camera, LiDAR and Radar, 2020, IEEE Intelligent Vehicles Symposium, pp. 1-9. (Year: 2020).*

Xu et al, C2F2NeUS Cascade Cost Frustum Fusion for High Fidelity and Generalizable Neural Surface Reconstruction, 2023, arXiv:2306.10003v1, pp. 1-10. (Year: 2023).*

Kim et al., GRIF Net: Gated Region of Interest Fusion Network for Robust 3D Object Detection from Radar Point Cloud and Monocular Image, 2020, IEEE/RSJ International Conference on Intelligent Robots and Systems, pp. 1-9. (Year: 2020).*

English Translation of the Korean Office Action mailed on Apr. 8, 2024, issued in the corresponding Korean Application No. 10-2023-0096379, filed on Dec. 23, 2021; 10 pages.

Xiong, W. et al., "LXL: LiDAR Excluded Lean 3D Object Detection with 4D Imaging Radar and Camera Fusion," 14 pages.

* cited by examiner (A) Camera-radar         (B) Camera feature map         (C) Radar feature map
    fusion feature map

SYSTEM AND METHOD FOR PERCEIVING 3-D ENVIRONMENT USING CAMERA AND RADAR

CROSS-REFERENCE TO RELATED APPLICATION

This application is based on and claims priority under 35 U.S.C. 119 to Korean Patent Application No. 10-2023-0096379 filed on Jul. 24, 2023, in the Korean intellectual property office, the disclosures of which are herein incorporated by reference in their entireties.

TECHNICAL FIELD

The following description relates to a technology for perceiving an autonomous driving environment.

BACKGROUND OF THE DISCLOSURE

Recently, there is a great demand for automotive intellectualization technologies, such as autonomous driving and an advanced driver assistance system (ADAS).

The autonomous driving technology may basically include a step (perception area) of perceiving a surrounding environment, a step (determination area) of planning a driving path from a perceived environment, and a step (control area) of a vehicle traveling along the planed driving path.

In particular, the perception area is a base technology that is first performed for autonomous driving. The determination area and the control area, that is, subsequent steps, can be accurately performed only when the technology in the perception area is accurately performed.

The importance of a technology for perceiving a three-dimensional (3-D) driving environment comes to the fore. The technology for perceiving a 3-D driving environment includes an object perception technology and a drivable area segmentation technology.

The object perception technology is a technology for detecting the location (x, y, and z direction information), size (width, length, and height information), and direction (angle information) of a vehicle-around dynamic obstacle (e.g., a vehicle or a pedestrian).

The drivable area segmentation technology is a technology for detecting the location of a vehicle-around static environment (e.g., a lane or a drivable area).

The technology in the perception area basically depends on a camera or a radar sensor.

The camera and the radar sensor may be said to be only sensors which may be mounted on a commercial vehicle because they are cheap and have high reliability and maintainability.

The camera may identify the type of object up to a very long distance, and provides semantic information for the detection of a signal light or a lane. The radar sensor has an advantage in that it provides distance information along with speed information up to a long distance robustly to a weather environment.

The advantages of the camera and the radar sensor are functions which are not provided by LiDAR, and are information which can be provided by only the camera and the radar sensor. Accordingly, the camera and the radar sensor are essentially mounted on a vehicle for high-level automotive intellectualization.

An object detection technology using the camera and the radar sensor is already used in a commercial vehicle as the ADAS, but has limits in that the object detection technology can be used only in a limited environment (e.g., a spatial limit, such as an expressway, and the need for a minimum speed at which a function operates) due to limited performance.

A sensor fusion technology that is used in the existing ADAS uses a late fusion method of fusing object information that is detected by independently using a camera (e.g., Mobileye) and radar (e.g., Continental and Delphi) through a post-processing method, such as cross verification in the final step.

In such a late fusion method, the width of improved performance is very limited because information which may be used to detect an object is lost in a process of independently detecting, by each sensor, the object and the results of inference have different performance, errors, and noise. If the results of detection of sensors are not matched, performance of the late fusion method is reduced.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An embodiment may provide a sensor fusion-based 3-D environment perception algorithm, which can overcome the limit of a single sensor through an environment perception technology using a camera and radar, can robustly operate even in an environment change (e.g., snow, rain, or at night) or an abnormal single sensor input (e.g., a sensor failure situation), and can have a high performance having a LiDAR level by considering complementary characteristics of sensors.

In an embodiment, there is provided a method of perceiving a three-dimensional (3-D) environment, which is performed in a computer device, wherein the computer device includes at least one processor configured to execute computer-readable instructions included in memory, and the method includes, in order to generate a 3-D feature map that is used to perceive an environment through a fusion of a camera and a radar sensor, extracting, by the at least one processor, a two-dimensional (2-D) feature map from an image obtained by the camera, and transforming, by the at least one processor, the 2-D feature map into a feature map in a 3-D space by using first distance information extracted from the image and second distance information measured by the radar sensor.

According to an aspect, extracting the 2-D feature map may include extracting semantic information and spatial information from inputs of sensors including the camera and the radar sensor.

According to another aspect, wherein extracting the 2-D feature map may include extracting distance information having a distribution form and an image feature map from a 2-D image obtained by the camera.

According to still another aspect, extracting the 2-D feature map may include extracting radar occupancy and a radar feature map from a radar input having a bird's-eye-view representation.

According to still another aspect, transforming the 2-D feature map into the feature map may include transforming, into a bird's-eye-view representation, the 2-D feature map which is an image feature map extracted from the image by using depth distribution extracted from the image and radar occupancy measured by the radar sensor.

According to still another aspect, transforming the 2-D feature map into the feature map may include obtaining a first frustum view feature map through an outer product of the image feature map and the depth distribution, obtaining a second frustum view feature map through an outer product of the image feature map and the radar occupancy, and transforming the image feature map into the bird's-eye-view representation by concatenating the first frustum view feature map and the second frustum view feature map.

According to still another aspect, transforming the image feature map into the bird's-eye-view representation may include aggregating feature values of frustum grids assigned to a bird's-eye-view grid by average-pooling the feature values.

According to still another aspect, transforming the 2-D feature map into the feature map may include fusing a camera feature map and radar feature map of a bird's-eye-view representation.

According to still another aspect, fusing the camera feature map and the radar feature map may include fusing the camera feature map and the radar feature map by using a concatenation mechanism or a cross attention mechanism.

According to still another aspect, fusing the camera feature map and the radar feature map may include fusing the camera feature map and the radar feature map that are obtained for each time.

According to still another aspect, the method may further include perceiving, by the at least one processor, an autonomous driving environment by using the 3-D feature map.

According to still another aspect, perceiving the autonomous driving environment may include performing at least one of 3-D object detection, 3-D object tracking, drivable area segmentation, and lane segmentation by using the 3-D feature map.

In an embodiment, there is provided a non-transitory computer-readable recording medium storing a computer program in order to execute a method of perceiving a three-dimensional (3-D) environment in a computer, the method including, in order to generate a 3-D feature map that is used to perceive an environment through a fusion of a camera and a radar sensor, extracting a two-dimensional (2-D) feature map from an image obtained by the camera, and transforming the 2-D feature map into a feature map in a 3-D space by using first distance information extracted from the image and second distance information measured by the radar sensor.

In an embodiment, there is provided a system for perceiving a three-dimensional (3-D) environment, which is implemented by a computer, the system including at least one processor configured to execute computer-readable instructions included in memory, wherein in order to generate a 3-D feature map that is used to perceive an environment through a fusion of a camera and a radar sensor, the at least one processor extracts a two-dimensional (2-D) feature map from an image obtained by the camera, and transforms the 2-D feature map into a feature map in a 3-D space by using first distance information extracted from the image and second distance information measured by the radar sensor.

According to embodiments of the present disclosure, element technologies that are necessary for automotive intellectualization can efficiently performed by using a 3-D feature map including all types of information, such as the type and location of an object, a lane, and a drivable area, in a 3-D space.

According to embodiments of the present disclosure, the system and method according to embodiments of the present disclosure can operate in a high-speed driving environment and various driving conditions as an automotive intellectualization technology by using both the camera and the radar sensor, can operate by distinguishing between objects up to a very long distance, and can operate with high performance in various driving conditions (e.g., snow, rain, and at night) through the radar sensor that is robust against an environment change.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the disclosure.

Hereinafter, embodiments of the present disclosure are described in detail with reference to the accompanying drawings.

Embodiments of the present disclosure relate to a technology for perceiving an autonomous driving environment.

Embodiments including contents that are specifically disclosed in this specification include transforming two-dimensional (2-D) information of the entire area by a camera into a three-dimensional (3-D) space by using the camera and radar. According to the embodiments, element technologies that are necessary for the intellectualization of an autonomous vehicle can be efficiently performed because a 3-D feature map can be generated based on the fusion technology of a camera and radar.

A system for perceiving a 3-D environment according to embodiments of the present disclosure may be implemented in at least one computer device. A method of perceiving a 3-D environment according to embodiments of the present disclosure may be performed through at least one computer device that is included in the system for perceiving a 3-D environment. In this case, a computer program according to an embodiment of the present disclosure may be installed and driven in the computer device. The computer device may perform the method of perceiving a 3-D environment according to embodiments of the present disclosure under the control of the driven computer program. The computer program may be stored in a computer-readable recording medium in order to execute the method of perceiving a 3-D environment in a computer in combination with the computer device.

Figure 1:
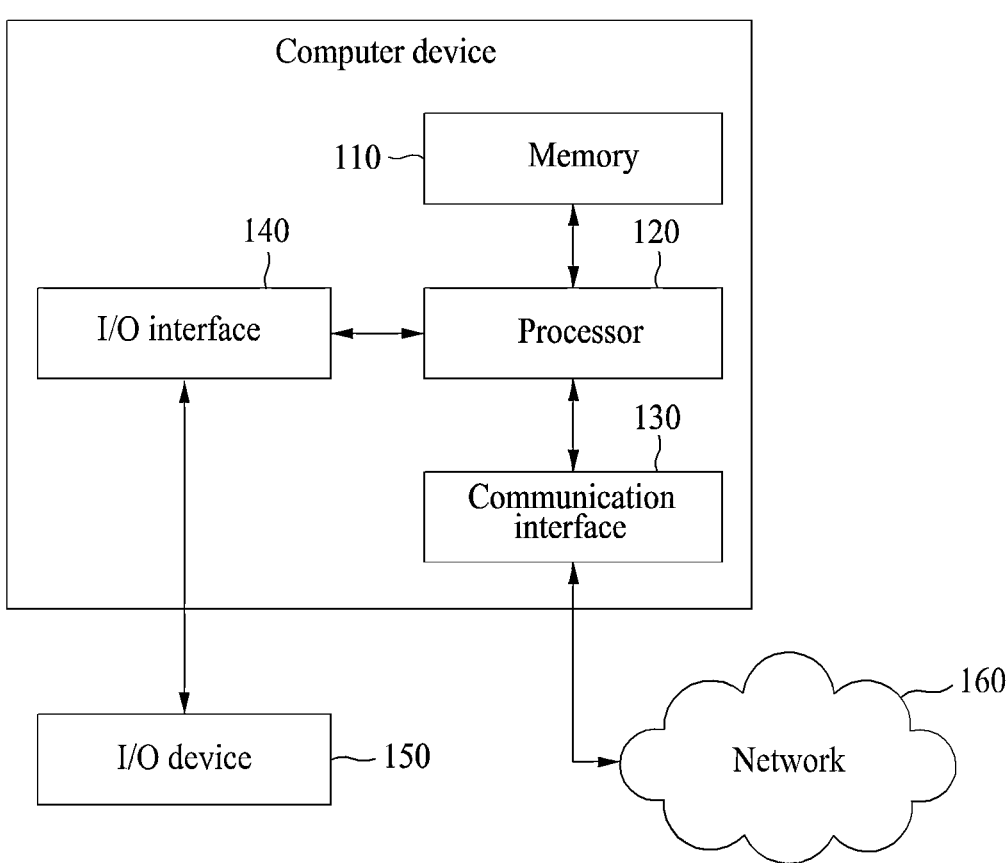
FIG. 1 is a block diagram for describing an example of internal components of a computer device in an embodiment of the present disclosure.

FIG. 1 is a block diagram for describing an example of internal components of a computer device in an embodiment of the present disclosure. For example, a system for perceiving a 3-D environment according to embodiments of the present disclosure may be implemented in a computer device 100 illustrated in FIG. 1.

As illustrated in FIG. 1, the computer device 100 is a component for executing the method of perceiving a 3-D environment according to embodiments of the present disclosure, and may include memory 110, a processor 120, a communication interface 130, and an input and output (I/O) interface 140.

The memory 110 is a computer-readable recording medium, and may include permanent mass storage devices, such as random access memory (RAM), read only memory (ROM), and a disk drive. In this case, the permanent mass storage device, such as ROM and a disk drive, may be included in the computer device 100 as a permanent storage device separated from the memory 110. Furthermore, an operating system and at least one program code may be stored in the memory 110. Such software components may be loaded onto the memory 110 from a computer-readable recording medium separated from the memory 110. Such a separate computer-readable recording medium may include computer-readable recording media, such as a floppy drive, a disk, a tape, a DVD/CD-ROM drive, and a memory card. In another embodiment, the software components may be loaded onto the memory 110 through the communication interface 130 not a computer-readable recording medium. For example, the software components may be loaded onto the memory 110 of the computer device 100 based on a computer program installed by files received over a network 160.

The processor 120 may be configured to process instructions of a computer program by performing basic arithmetic, logic, and I/O operations. The instructions may be provided to the processor 120 by the memory 110 or the communication interface 130. For example, the processor 120 may be configured to execute received instructions based on a program code that has been stored in a recording device, such as the memory 110.

The communication interface 130 may provide a function for enabling the computer device 100 to communicate with other devices over the network 160. For example, a request, an instruction, data, or a file that is generated by the processor 120 of the computer device 100 based on a program code that has been stored in a recording device, such as the memory 110, may be transferred to other devices over the network 160 under the control of the communication interface 130. Inversely, a signal, an instruction, data, or a file from another device may be received by the computer device 100 through the communication interface 130 of the computer device 100 over the network 160. A signal, an instruction, a file that is received through the communication interface 130 may be transmitted to the processor 120 or the memory 110. A file that is received through the communication interface 130 may be stored in a storage medium (e.g., the aforementioned permanent storage device) which may be further included in the computer device 100.

The communication method is not limited, and may include short-distance wired/wireless communication between devices, in addition to communication methods using communication networks (e.g., a mobile communication network, wired Internet, wireless Internet, and a broadcasting network) which may be included in the network 160. For example, the network 160 may include one or more arbitrary networks of a personal area network (PAN), a local area network (LAN), a campus area network (CAN), a metropolitan area network (MAN), a wide area network (WAN), a broadband network (BBN), and the Internet. Furthermore, the network 160 may include one or more of network topologies, including a bus network, a star network, a ring network, a mesh network, a star-bus network, and a tree or hierarchical network, but is not limited thereto.

The I/O interface 140 may be means for an interface with an I/O device 150. For example, the input device may include a device, such as a microphone, a keyboard, a camera, or a mouse. The output device may include a device, such as a display or a speaker. Furthermore, for example, the I/O interface 140 may be means for an interface with a device in which functions for an input and an output have been integrated into one, such as a touch screen. The I/O device 150, together with the computer device 100, may be configured as a single device.

Furthermore, in other embodiments, the computer device 100 may include components greater or smaller than the components of FIG. 1. However, it is not necessary to clearly illustrate most of conventional components. For example, the computer device 100 may be implemented to include at least some of the I/O devices 150 or may further include other components, such as a transceiver, a camera, various types of sensors, and a database.

Detailed embodiments of a technology for perceiving a 3-D environment using a camera and radar are described below.

With the recent development of the deep learning technology, a method of effectively extracting high-dimensional information (feature) including semantic information from low-dimensional sensor input data is developed. Accordingly, it is prospect to use an approach method (early fusion) of fusing features extracted through a deep learning model in an intermediate step without using the final results as in the late fusion.

The camera and the radar sensor require a sensor fusion method into which such sensor characteristics have been incorporated because they are very mutually complementary as follows. The camera provides semantic information on which the type of object can be distinguished. If an image pixel is used, the location of an object in a transverse direction (i.e., an angle direction) can be accurately known, but distance information of the object is inaccurate and the camera is vulnerable to a change in weather and a light source. The radar sensor provides speed information (Doppler), and a distance direction thereof is accurate, that is, several cm, but resolution and accuracy thereof in the angle direction is relatively low, that is, tens of cm.

The present embodiments may provide a sensor fusion-based 3-D environment perception algorithm, which can overcome the limit of a single sensor, can robustly operate even in an environment change (e.g., snow, rain, or at night) or an abnormal single sensor input (e.g., sensor failure situation), and can have high performance having a LiDAR level by considering complementary characteristics of each sensor.

Figure 2:
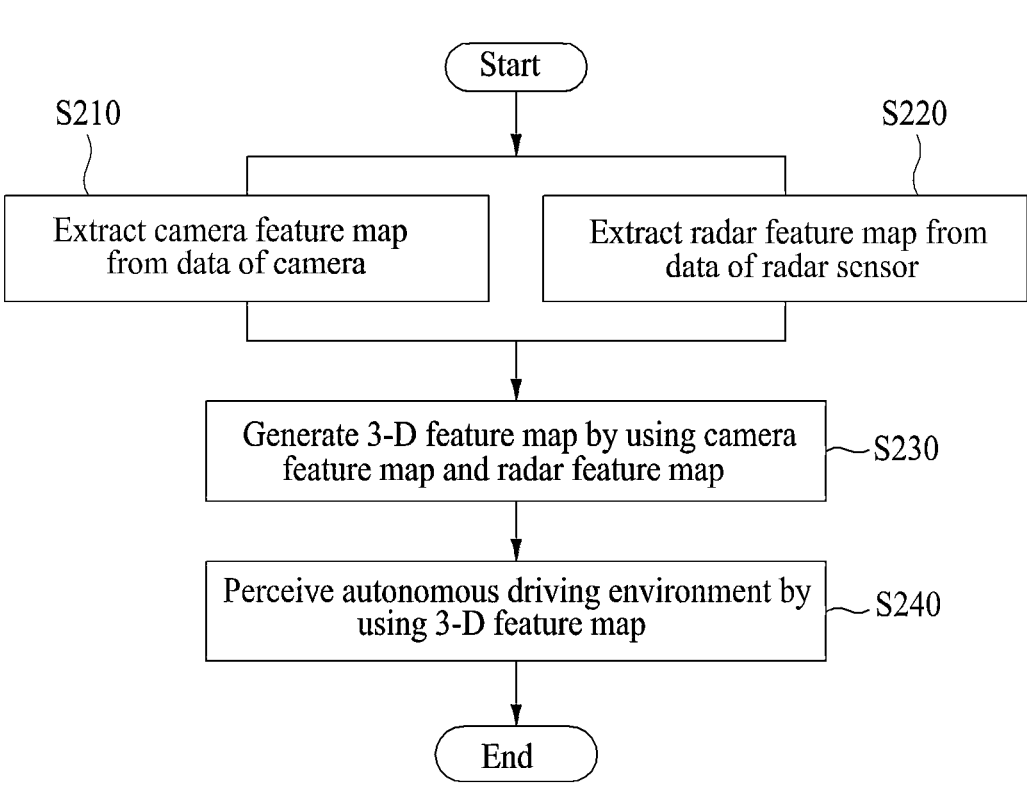
FIG. 2 is a flowchart illustrating an example of a method of perceiving a 3-D environment, which may be performed by the computer device, according to an embodiment of the present disclosure.

FIG. 2 is a flowchart illustrating an example of a method of perceiving a 3-D environment, which may be performed by the computer device, according to an embodiment of the present disclosure.

The computer device 100 according to the present embodiment may provide a client with a target service through a dedicated application that is installed in the client or through access to a web/mobile site related to the computer device 100. A system for perceiving a 3-D environment, which is implemented by a computer, may be constructed in the computer device 100. For example, the system for perceiving a 3-D environment may be implemented in the form of a program that independently operates or may be constructed in an in-app form of a specific application and implemented to operate on the specific application.

The processor 120 of the computer device 100 may be implemented as a component for performing the method of perceiving a 3-D environment. According to an embodiment, components of the processor 120 may be selectively included in the processor 120 or excluded therefrom. Furthermore, according to an embodiment, the components of the processor 120 may be separated or merged for the representation of functions of the processor 120.

The processor 120 and the components of the processor 120 may control the computer device 100 so that the computer device 100 performs steps included in the method of perceiving a 3-D environment. For example, the processor 120 and the components of the processor 120 may be implemented to execute an instruction according to a code of an operating system and a code of at least one program, which are included in the memory 110.

In this case, the components of the processor 120 may be the representations of different functions that are performed by the processor 120 in response to an instruction provided by a code of the program stored in the computer device 100.

The processor 120 may read a required instruction from the memory 110 on which instructions related to control of the computer device 100 have been loaded. In this case, the read instruction may include an instruction for controlling the processor 120 so that the processor 120 executes steps to be described later.

The steps included in the method of perceiving a 3-D environment may be performed in order different from an illustrated order. Some of the steps may be omitted or an addition process may be further included in the steps.

Referring to FIG. 2, in step S210, the processor 120 may extract a camera feature map from data of a camera.

In step S220, the processor 120 may extract a radar feature map from data of a radar sensor.

The processor 120 may extract semantic information and spatial information from the inputs of sensors including the camera and the radar sensor.

In step S230, the processor 120 may generate a 3-D feature map by using the camera feature map and the radar feature map. The processor 120 may extract a feature map in a 3-D space by fusing spatial and informative characteristics of data that are provided by the sensors (i.e., the camera and the radar sensor). The camera has only 2-D information projected onto an image plane. The processor 120 may transform the 2-D image feature map into the 3-D space based on distance information that has been predicted through the 2-D image feature map. In this case, the processor 120 may predict the distance information that is inherent in the image by using a convolutional neural network (CNN), multi-layer perceptron (MLP), or cross-attention. In order to supplement the inaccuracy of the distance predicted by using only the image, a degree of accuracy in the 3-D transformation process can be increased by also using distance information measured by the radar sensor. The data of the radar sensor may be represented as a point cloud in the 3-D space or a tensor (range-azimuth-Doppler), which is obtained through 3-D and fourth-dimensional (4-D) radar. The 3-D feature map may be extracted from a 3-D radar input. The camera image and the radar feature map in the 3-D space may be formed into the 3-D feature map in which information of the camera and the radar sensor has been fused over an additional network. In this case, the processor 120 may fuse the 3-D camera and radar feature maps by using a CNN or cross-attention. In this specification, the 3-D feature map (X, Y, Z) may include a bird's-eye-view feature map (X, Y). In other words, the processor 120 may transform the 2-D feature map, that is, an image feature map extracted from an image obtained by the camera, into a bird's-eye-view representation, by using a depth distribution extracted from the obtained image and a radar occupancy measured by the radar sensor. Accordingly, in the present embodiment, 2-D camera information can be transformed into the 3-D space by supplementing distance information that is insufficient in information obtained by the camera complementary through the radar sensor.

In step S240, the processor 120 may perform an element technology necessary to perceive an autonomous driving environment by using the 3-D feature map that has been obtained through the fusion of the data of the camera and the radar sensor. The element technology necessary to perceive the autonomous driving environment may include 3-D object detection, 3-D object tracking, drivable area segmentation, and lane segmentation. The entire system can efficiently operate because various element technologies can operate by attaching a detector specified for each element technology to the 3-D feature map including information of a vehicle driving environment.

In other words, in the present embodiment, (1) an image feature map and a depth distribution may be extracted from an image obtained by the camera (wherein a coordinate system is a perspective view (PV)), (2) a radar feature map and radar occupancy may be extracted from a radar input (wherein a coordinate system is a BEV), (3) [RVT] the image feature map of the PV may be transformed into the BEV by using both the depth distribution and the radar occupancy (i.e., the image feature map of the PV is transformed into the BEV because only the camera image is a PV), (4) [multi-modal deformable cross attention (MDCA)] an image feature map and a radar feature map in the same BEV may be fused, (5) the perception of an autonomous driving environment may be performed by using the fused BEV camera-radar feature map.

Figure 3:
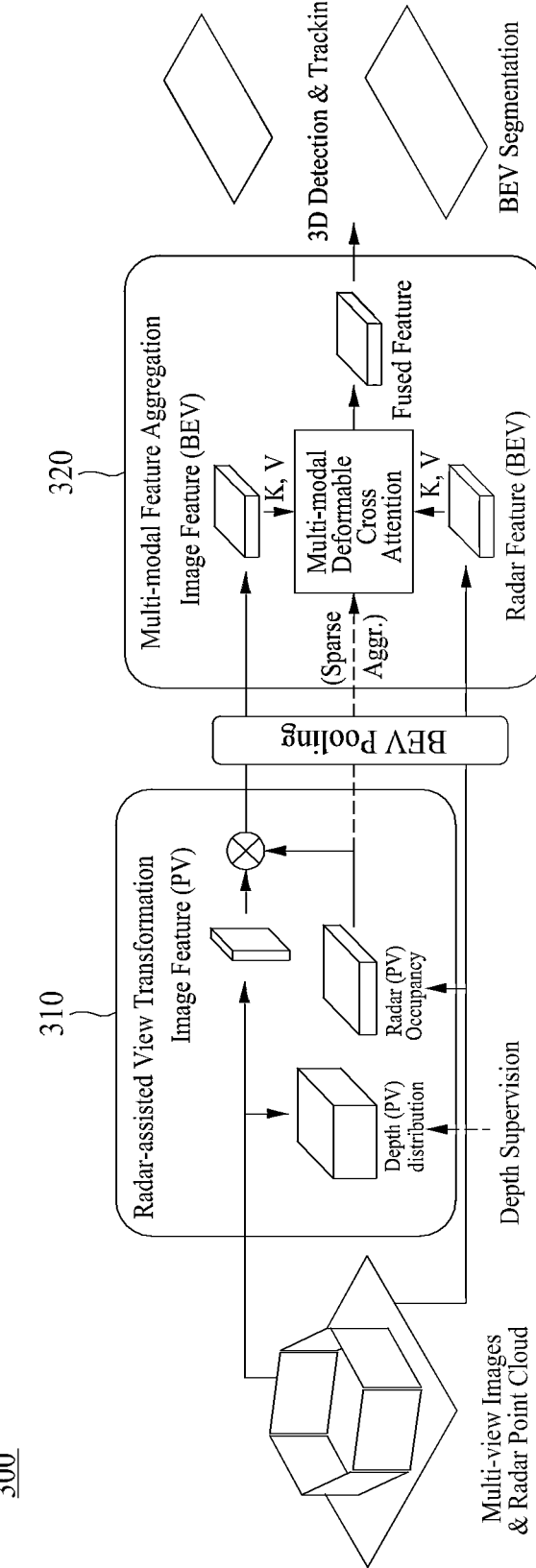
FIG. 3 illustrates an example of a camera-radar fusion framework in an embodiment of the present disclosure.

FIG. 3 illustrates an example of a camera-radar fusion framework in an embodiment of the present disclosure.

Referring to FIG. 3, the processor 120 may generate a semantically rich and spatially accurate bird's-eye-view (BEV) feature map for various tasks over a camera-radar fusion framework 300. For autonomous driving, 3-D object detection and drivable area segmentation technologies may be performed on camera and radar data sets obtained in various areas and driving environments (e.g., daytime, nighttime, and rain). In this case, the processor 120 uses radar-assisted view transformation (RVT) 310 in order to overcome the shortage of space information of an image, and may transform a perspective view image feature (PV) into a BEV by using radar points according to radar measurement, which are scarce, but are accurate. Furthermore, the processor 120 may generate a semantically rich and spatially accurate BEV representation by adaptively aggregating the image and a radar feature map through a multi-modal feature aggregation (MFA) 320 that has been designed to solve spatial misalignment between inputs.

In other words, according to the present embodiments, a semantically rich and spatially accurate BEV feature map may be generated by fusing complementary characteristics of the camera and the radar sensor. To this end, the image feature of the perspective view may be transformed into the BEV by using the RVT 310 without depending on only an estimated depth. A multi-modal feature map may be consecutively encoded into a unified feature map by using an attention mechanism according to the layer of MFA 320 because the transformed image feature of the BEV is not fully accurate.

The camera-radar fusion technology is described in detail as follows.

The crux of monocular 3-D perception is how to construct accurate 3-D (or BEV) information from 2-D features.

A geometry-based approach may include predicting a depth D as an intermediate representation, transforming a perspective view (u, v) into a frustum view (d, u, v) in a feature F, and then transforming the frustum view (d, u, v) into 3-D (x, y, z) according to Equation 1.

$$F_{3D}(x, y, z) = \mathcal{M}(F_{2D}(u, v) \otimes D(u, v)) \tag{1}$$

wherein $\mathcal{M}$ denotes a view transform module, and $\otimes$ denotes an outer product.

A learning-based approach is to implicitly model a 3-D into a 2-D by using a mapping network.

$$F_{3D}(x, y, z) = f(P_{xyz}, F_{2D}(u, v)) \tag{2}$$

wherein f denotes a mapping function (e.g., a multi-layer perceptron, cross-attention) between a perspective view and a BEV. $P_{xyz}$ means the voxel of a 3-D space.

The geometry-based approach and the learning-based approach are different from each other, but the crux thereof is to spatially obtain an accurate 3-D feature $F_{3D}(x, y, z)$ through an implicit or explicit transform. The present embodiment aims to explicitly improve the transformation process by using radar measurement.

Radar may have various representations, such as a 2-D FFT, a 3-D tensor, and point cloud. Radar point clouds have a representation similar to LiDAR, but their characteristics are different in terms of resolution and accuracy. Moreover, due to the nature of the operating mechanism of radar and its millimeter scale wavelength, radar measurements are noisy and ambiguous, and do not provide elevation. In other words, radar measurements are often not returned when objects exist or are returned when objects do not exist. In the present embodiment, radar may be used in an adaptive manner in order to handle the sparsity and ambiguity of radar.

Radar-Assisted View Transformation (RVT) 310

Figure 4:
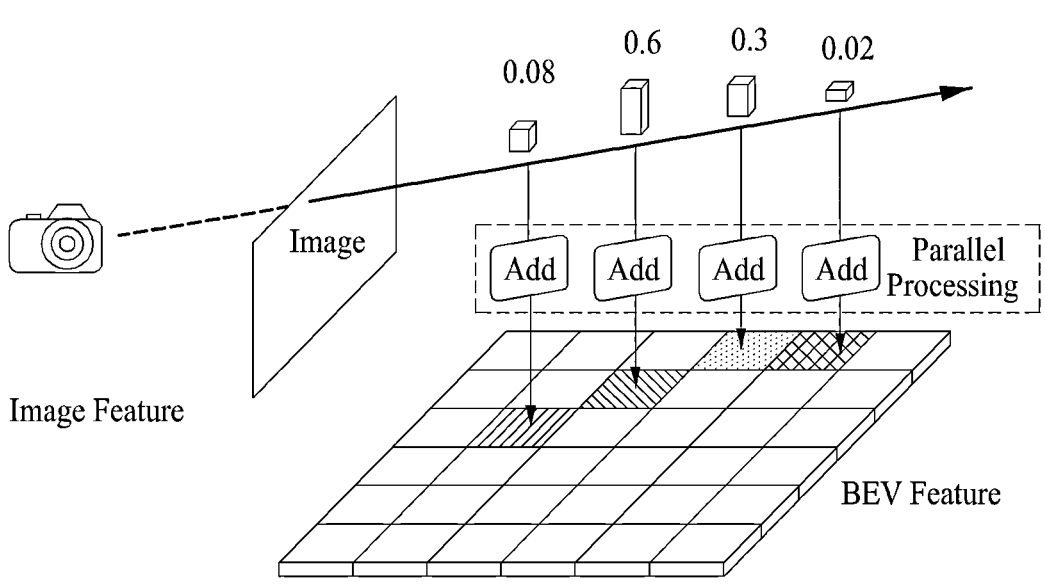
FIG. 4 is an exemplary drawing for describing a process of predicting distance information that is inherent in an image in an embodiment of the present disclosure.

FIG. 4 is an exemplary drawing for describing a process of predicting distance information that is inherent in an image in an embodiment of the present disclosure. A depth distribution may be extracted by calculating the probability that information inherent in an image is present in a specific distance in a distribution form.

Figure 5:
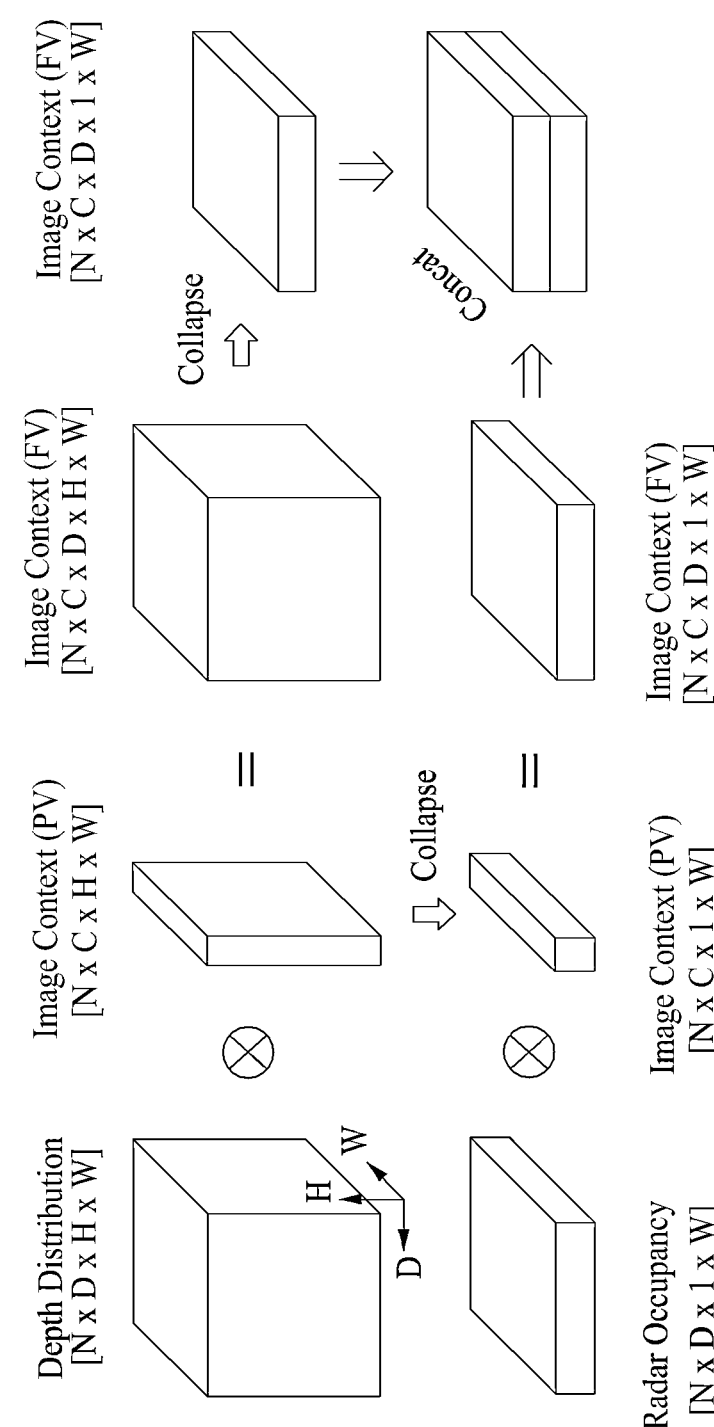
FIG. 5 is an exemplary drawing for describing a radar-assisted view transformation (RVT) process in an embodiment of the present disclosure.

FIG. 5 is an exemplary drawing for describing an RVT process in an embodiment of the present disclosure. The RVT 310 may obtain a spatial accurate image feature map based on a depth distribution that is dense, but is less accurate and radar occupancy that is sparse, but accurate.

When N surrounding image sets are given, a 16× down-sampled feature map $F_I$ is obtained with respect to each image view by using an image backbone having a feature pyramid network (FPN). Thereafter, an additional convolution layer may extract an image feature map $$C_I^{PV} \in \mathbb{R}^{N \times C \times H \times W}$$

and a depth distribution $D_I \in \mathbb{R}^{N \times D \times H \times W}$ of each pixel from a perspective view.

$$C_I^{PV} = Conv(F_I), \quad D_I(u, v) = \text{Softmax}(Conv(F_I)(u, v)) \tag{3}$$

wherein (u, v) denotes the coordinates of an image plane. D means the number of depth bins.

Unlike in a method of directly lifting the image feature into a BEV by using the depth distribution estimated as in Equation 1, noise, but accurate radar measurements may be used for view transformation.

Radar points are first projected onto each N camera view to find corresponding image pixels, and are then voxelized into a camera frustum view voxel $$V_P^{FV}(d, u, v).$$

In this case, u and v are pixel units in the image width and height directions, and d is a metric unit in a depth direction. The radar is set to v=1 to use a pillar style because the radar does not provide reliable elevation measurements. The non-empty radar pillars are encoded into features $F_P \in \mathbb{R}^{N \times C \times D \times W}$ with PointNet and sparse convolution. As in Equation 3, the radar feature map $$C_P^{FV} \in \mathbb{R}^{N \times C \times D \times W}$$

and the radar occupancy $O_P \in \mathbb{R}^{N \times 1 \times D \times W}$ are extracted in the frustum view. Here, the convolution is applied to top-view (d, u) coordinates instead of (u, v):

$$C_P^{FV} = Conv(F_P), \quad O_P(d, u) = \sigma (Conv(F_P)(d, u)) \tag{4}$$

wherein a sigmoid is used instead of softmax because the radar occupancy is not necessarily one-hot encoded as a depth distribution.

Furthermore, a given depth distribution $D_I$, a radar occupancy $O_P$, and an image feature map $$C_I^{PV}$$

are transformed into a camera frustum view $$C_I^{FV} \in \mathbb{R}^{N \times C \times D \times W}$$

by the outer product.

$$C_I^{FV} = Conv\left[C_I^{PV} \otimes D_I; C_I^{PV} \otimes O_P\right] \quad (5)$$

wherein $$[\cdot ; \cdot]$$

denotes a concatenation that operates along the channel dimension. Due to the absence of a height dimension in radar and for saving memory, the image context feature is collapsed by summation along a height axis, as illustrated in FIG. 5.

Finally, camera and radar feature maps of an N camera frustum view $$F^{FV} = \left\{ C_I^{FV}, C_R^{FV} \in \mathbb{R}^{N \times C \times D \times H \times W} \right\}$$

may be transformed into a single BEV space $\mathbb{R}^{C \times 1 \times X \times Y}$ by the view transform module $\mathcal{M}$.

$$F^{BEV} = \mathcal{M}\left(\left\{F_i^{FV}\right\}_{i=1}^N\right) \quad (6)$$

The processor 120 may obtain a first frustum view feature map by an outer product of an image feature map and a depth distribution, may obtain a second frustum view feature map by an outer product of the image feature map and radar occupancy, and may transform the image feature map into a BEV representation by concatenating the first frustum view feature map and the second frustum view feature map.

In the present embodiment, a CUDA-enabled voxel pooling implementation is applied. In this case, a structure in which features are aggregated within each BEV grid by using average pooling instead of summation may be applied. A network may be helped to predict a more consistent BEV feature map regardless of the distance to an ego vehicle because a closer BEV grid is associated with a more frustum grid due to the perspective projection.

When the frustum view having the coordinate system [u, v, d] is transformed into the BEV coordinate system [x, y, z], an area that is occupied by the grid of the frustum view in the BEV is reduced as the distance becomes closer, and the area that is occupied by the grid of the frustum view in the BEV is increased as the distance becomes m ore distant. Accordingly, several frustum grids are assigned to the BEV grid having the close distance. For this reason, feature values of several frustum grids may be averaged and used.

Multi-Modal Feature Aggregation (MFA) 320

Combining pieces of complementary multi-modal information while avoiding the drawbacks of the multi-modal information is especially crucial in a camera radar fusion. An image feature has rich semantic cues, but its spatial position is inherently inaccurate. In contrast, a radar feature is spatially accurate, but contextual information thereof is insufficient and noisy. A simple fusion method through channel-wise concatenation or summation is less effective because the method can handle neither spatial misalignment nor ambiguity between two modalities. In order to have the best of both worlds, in the present embodiment, a multi-modal feature may be used in an adaptive manner by using a concatenation mechanism or an attention mechanism. In the present embodiment, after a camera feature map (i.e., an image feature map) of a PV representation is transformed into a BEV representation, the camera feature map and radar feature map of the BEV representation may be fused by using the concatenation mechanism or the cross attention mechanism.

Cross attention is inherently suitable for multi-modal fusion. However, a computation cost thereof is quadratic to an input sequence length $\mathcal{O}(N^2)$, where N=XY and X, Y denote the height and width of the BEV feature map. If a perception range R=X/2=Y/2 is assumed, computation complexity becomes a biquadratic $\mathcal{O}(16R^4)$ to a perception range, which is not scalable for a long-range perception. A fusion technology based on deformable attention is of linear complexity with the input size $\mathcal{O}(2N+NK)$, where K is the total number of the sampled key (K<<N=XY).

If a flattened BEV feature map $$x_m = \left\{ C_I^{BEV}, C_R^{BEV} \in \mathbb{R}^{C \times XY} \right\}$$

is given, first, $x_m$ is projected onto a C-dimensional query feature after being concatenated as $z_q = W_z[LN(C_I); LN(C_P)]$. In this case, $W_z \in \mathbb{R}^{C \times 2C}$ is a linear projection, and LN is a layer norm. Thereafter, the feature map may be aggregated as in Equation 7 by multi-modal deformable cross attention (MDCA).

$$MDCA(z_q, p_q, x_m) = \sum_h^H W_h \left[ \sum_m^M \sum_k^K A_{hmqk} \cdot W_{hm}^i x_m (\phi_m(p_q + \Delta p_{hmqk})) \right] \quad (7)$$

wherein h, m, and k index an attention head, modality, and a sampling point. In order to better use the multi-modal information, attention weights $A_{hmqk}$ and a sampling offset $\Delta p_{hmqk}$ are separately applied to the multi-modal feature maps $x_m$.

In the present embodiment, the 2-D feature map of the camera can be accurately transformed into a 3-D and by using radar. A method of fusing the feature maps of the camera and the radar sensor in a 3-D by using the cross-attention method may be applied. The MFA 320 according to an embodiment of the present disclosure may generate a more stable BEV feature map through the fusion of the data of the camera and the radar sensor.

Furthermore, in the present embodiment, the camera feature map and the radar feature map of a BEV representation that are obtained for each time may be fused. A BEV feature map may be obtained at several consecutive times, for example, [ . . . , t–2, t–1, t, . . . ]. The final BEV feature map can be improved by fusing the BEV feature maps.

Figure 6:
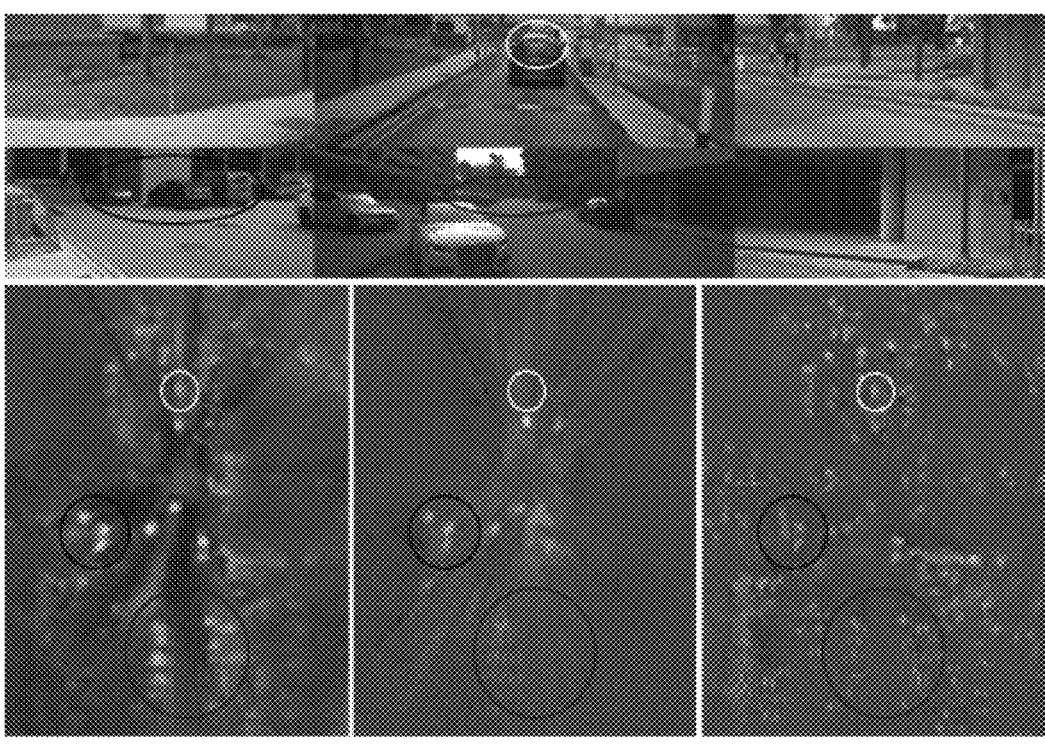
FIG. 6 illustrates an example of a camera-radar fusion feature map, a camera feature map, and a radar feature map in an embodiment of the present disclosure.

FIG. 6 illustrates an example of a camera-radar fusion feature map, a camera feature map, and a radar feature map in an embodiment of the present disclosure. A 3-D feature map (i.e., the feature map in FIG. 6(A)) obtained through the camera-radar fusion shows that an environment in which diffused reflection that is difficult to detect when radar is solely used occurs or an object having low reflexibility like a person can be well detected, and a vehicle out of a front vehicle thereof, which is rarely seen in a camera image, or an object at a very long distance can also be well detected.

Although MDCA has linear complexity with respect to the size of BEV grids, the MDCA still may be a bottleneck when a perception range thereof becomes large. In the present embodiment, a method to further reduce the number of input queries from N=XY to $N=N_k \ll XY$ by using features with top-k confidence may be applied. If the BEV depth distribution $D_f$ and radar occupancy $O_P$ are given, the $N_k$ feature $$z_q^{N_k} \in \mathbb{R}^{C \times N_k}$$

is selected from input queries $z_q \in \mathbb{R}^{C \times XY}$ by using a probability of max $(D_f, O_P)$. The complexity of such a sparse aggregation is independent of the perception range, and is more efficient for long-range perception.

As described above, according to embodiments of the present disclosure, element technologies necessary for automotive intellectualization can be efficiently performed by using a 3-D feature map including all of pieces of information, such as the type and location of an object, a lane, and a drivable area in a 3-D space. Furthermore, the system and method according to embodiments of the present disclosure can operate in a high-speed driving environment and various driving conditions as an automotive intellectualization technology by using both the camera and the radar sensor, can operate by distinguishing between objects up to a very long distance, and can operate with high performance in various driving conditions (e.g., snow, rain, and at night) through the radar sensor that is robust against an environment change.

Accordingly, in the present embodiment, in order to overcome the shortage of space information of an image, a perspective view image feature can be transformed into a BEV by using scarce, but accurate radar points. In this case, in order to solve spatial misalignment between inputs, an image and a radar feature map can be additionally aggregated from the BEV by using the MDCA.

The aforementioned device may be implemented as a hardware component, a software component, and/or a combination of a hardware component and a software component. For example, the device and component described in the embodiments may be implemented by using one or more general-purpose computers or special-purpose computers, such as a processor, a controller, an arithmetic logic unit (ALU), a digital signal processor, a microcomputer, a field programmable gate array (FPGA), a programmable logic unit (PLU), a microprocessor, or any other device capable of executing or responding to an instruction. The processing device may perform an operating system (OS) and one or more software applications that are executed on the OS. Furthermore, the processing device may access, store, manipulate, process, and generate data in response to the execution of software. For convenience of understanding, one processing device has been illustrated as being used, but a person having ordinary knowledge in the art may understand that the processing device may include a plurality of processing elements and/or a plurality of types of processing elements. For example, the processing device may include a plurality of processors or one processor and one controller. Furthermore, another processing configuration, such as a parallel processor, is also possible.

Software may include a computer program, a code, an instruction or a combination of one or more of them, and may configure a processing device so that the processing device operates as desired or may instruct the processing devices independently or collectively. The software and/or the data may be implemented in any type of machine, a component, a physical device, or a computer storage medium or device in order to be interpreted by the processing device or to provide an instruction or data to the processing device. The software may be distributed to computer systems that are connected over a network, and may be stored or executed in a distributed manner. The software and the data may be stored in one or more computer-readable recording media.

The method according to an embodiment may be implemented in the form of a program instruction executable by various computer means, and may be stored in a computer-readable medium. In this case, the medium may continue to store a program executable by a computer or may temporarily store the program for execution or download. Furthermore, the medium may be various recording means or storage means having a form in which one or a plurality of pieces of hardware has been combined. The medium is not limited to a medium that is directly connected to a computer system, but may be ones that are distributed and present in a network. Examples of the medium may be magnetic media such as a hard disk, a floppy disk, and a magnetic tape, optical media such as CD-ROM and a DVD, magneto-optical media such as a floptical disk, and ones configured to store a program command, including ROM, RAM, and a flash memory. Furthermore, examples of another medium may include an app store in which apps are distributed, a site in which other various pieces of software are supplied or distributed, and recording media and/or storage media that are managed in a server.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims fall within the scope of the claims.

The invention claimed is:

1. A method of perceiving a three-dimensional (3-D) environment, which is performed in a computer device, wherein:

the computer device comprises at least one processor configured to execute computer-readable instructions included in memory, and the method comprises:

in order to generate a 3-D feature map that is used to perceive an environment through a fusion of a camera and a radar sensor, extracting, by the at least one processor, a two-dimensional (2-D) feature map from an image obtained by the camera; and transforming, by the at least one processor, the 2-D feature map into the 3-D feature map in a 3-D space by using first distance information extracted from the image and second distance information measured by the radar sensor, wherein transforming the 2-D feature map into the 3-D feature map comprises transforming, into a bird's-eye-view representation, the 2-D feature map which is an image feature map extracted from the image by using depth distribution extracted from the image and radar occupancy measured by the radar sensor, wherein transforming the 2-D feature map into the 3-D feature map further comprises:

obtaining a first frustum view feature map through an outer product of the image feature map and the depth distribution;

obtaining a second frustum view feature map through an outer product of the image feature map and the radar occupancy; and transforming the image feature map into the bird's-eye-view representation by concatenating the first frustum view feature map and the second frustum view feature map, wherein transforming the image feature map into the bird's-eye-view representation comprises aggregating feature values of frustum grids assigned to a bird's-eye-view grid by average-pooling the feature values.

2. The method of claim 1, wherein extracting the 2-D feature map comprises extracting semantic information and spatial information from inputs of sensors comprising the camera and the radar sensor.

3. The method of claim 2, wherein extracting the 2-D feature map comprises extracting distance information having a distribution form and the image feature map from a 2-D image obtained by the camera.

4. The method of claim 2, wherein extracting the 2-D feature map comprises extracting radar occupancy and a radar feature map from a radar input having a bird's-eye-view representation.

5. The method of claim 1, wherein transforming the 2-D feature map into the 3-D feature map comprises fusing a camera feature map and a radar feature map of a bird's-eye-view representation.

6. The method of claim 5, wherein fusing the camera feature map and the radar feature map comprises fusing the camera feature map and the radar feature map by using a concatenation mechanism or a cross attention mechanism.

7. The method of claim 5, wherein fusing the camera feature map and the radar feature map comprises fusing the camera feature map and the radar feature map that are obtained for each time.

8. The method of claim 1, further comprising perceiving, by the at least one processor, an autonomous driving environment by using the 3-D feature map.

9. The method of claim 8, wherein perceiving the autonomous driving environment comprises performing at least one of 3-D object detection, 3-D object tracking, drivable area segmentation, and lane segmentation by using the 3-D feature map.

10. A non-transitory computer-readable recording medium storing a computer program in order to execute a method of perceiving a three-dimensional (3-D) environment in a computer, the method comprising:

in order to generate a 3-D feature map that is used to perceive an environment through a fusion of a camera and a radar sensor, extracting a two-dimensional (2-D) feature map from an image obtained by the camera; and transforming the 2-D feature map into a feature map in a 3-D space by using first distance information extracted from the image and second distance information measured by the radar sensor, wherein transforming the 2-D feature map into the 3-D feature map comprises transforming, into a bird's-eye-view representation, the 2-D feature map which is an image feature map extracted from the image by using depth distribution extracted from the image and radar occupancy measured by the radar sensor, wherein transforming the 2-D feature map into the 3-D feature map further comprises:

obtaining a first frustum view feature map through an outer product of the image feature map and the depth distribution;

obtaining a second frustum view feature map through an outer product of the image feature map and the radar occupancy; and transforming the image feature map into the bird's-eye-view representation by concatenating the first frustum view feature map and the second frustum view feature map, wherein transforming the image feature map into the bird's-eye-view representation comprises aggregating feature values of frustum grids assigned to a bird's-eye-view grid by average-pooling the feature values.

11. A system for perceiving a three-dimensional (3-D) environment, which is implemented by a computer, the system comprising:

at least one processor configured to execute computer-readable instructions included in memory, wherein in order to generate a 3-D feature map that is used to perceive an environment through a fusion of a camera and a radar sensor, the at least one processor extracts a two-dimensional (2-D) feature map from an image obtained by the camera, and transforms the 2-D feature map into the 3-D feature map in a 3-D space by using first distance information extracted from the image and second distance information measured by the radar sensor, wherein transforming the 2-D feature map into the 3-D feature map comprises transforming, into a bird's-eye-view representation, the 2-D feature map which is an image feature map extracted from the image by using depth distribution extracted from the image and radar occupancy measured by the radar sensor, wherein transforming the 2-D feature map into the 3-D feature map further comprises:

obtaining a first frustum view feature map through an outer product of the image feature map and the depth distribution;

obtaining a second frustum view feature map through an outer product of the image feature map and the radar occupancy; and transforming the image feature map into the bird's-eye-view representation by concatenating the first frustum view feature map and the second frustum view feature map, wherein transforming the image feature map into the bird's-eye-view representation comprises aggregating feature values of frustum grids assigned to a bird's-eye-view grid by average-pooling the feature values.

12. The system of claim 11, wherein the at least one processor extracts distance information having a distribution form and an image feature map from a 2-D image obtained by the camera, and extracts radar occupancy and a radar feature map from a radar input having a bird's-eye-view representation.

13. The system of claim 11, wherein the at least one processor transforms, into a bird's-eye-view representation, the 2-D feature map which is an image feature map extracted from the image by using depth distribution extracted from the image and radar occupancy measured by the radar sensor.

14. The system of claim 11, wherein the at least one processor fuses a camera feature map and a radar feature map of a bird's-eye-view representation, and fuses the camera feature map and the radar feature map by using a concatenation mechanism or a cross attention mechanism.

15. The system of claim 11, wherein the at least one processor perceives an autonomous driving environment by using the 3-D feature map.

16. The system of claim 15, wherein the at least one processor performs at least one of 3-D object detection, 3-D object tracking, drivable area segmentation, and lane segmentation by using the 3-D feature map.

* * * * *